United States Patent
Testicioglu et al.

(10) Patent No.: US 9,992,120 B2
(45) Date of Patent: Jun. 5, 2018

(54) SYSTEM AND METHOD FOR RATE-BASED PACKET TRANSMISSION OVER A NETWORK

(71) Applicant: Citrix Systems, Inc., Fort Lauderdale, FL (US)

(72) Inventors: Mustafa Kutluk Testicioglu, Mountain View, CA (US); Mahesh Mylarappa, Sunnyvale, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 25 days.

(21) Appl. No.: 14/919,317

(22) Filed: Oct. 21, 2015

(65) Prior Publication Data

US 2017/0118120 A1 Apr. 27, 2017

(51) Int. Cl.
*H04L 1/00* (2006.01)
*H04L 12/803* (2013.01)
*H04W 28/02* (2009.01)
*H04L 5/00* (2006.01)
*H04L 12/26* (2006.01)

(52) U.S. Cl.
CPC .......... *H04L 47/125* (2013.01); *H04L 5/0055* (2013.01); *H04L 43/0888* (2013.01); *H04W 28/0273* (2013.01)

(58) Field of Classification Search
CPC combination set(s) only.
See application file for complete search history.

(56) References Cited

U.S. PATENT DOCUMENTS 7,512,066 B2 * 3/2009 Santos .................... H04L 47/10
370/230
8,553,540 B2 * 10/2013 Mehrotra ................ H04L 47/30
370/230

(Continued)

OTHER PUBLICATIONS

Aryasomayajula, Space Communication Protocol Standards-Transport Protocol (SCPS-TP) over Cislunar Communication Links and Delay Impact, Thesis, Lamar University, 81 pages, 2007.*

(Continued)

*Primary Examiner* — Frank Duong
(74) *Attorney, Agent, or Firm* — Foley & Lardner LLP; Christopher J. McKenna

(57) ABSTRACT

An appliance for controlling data transmission is described. The appliance includes a packet engine configured to acquire data regarding a flow of first data packets over a link and to determine transport communication protocol (TCP) characteristics for the flow. The appliance also includes a data transmission controller configured to receive second data packets, determine a rate of transmission based on the TCP characteristics, and determine, based on one or more criteria, whether to use a rate-based data transmission control to control a transmission of the second data packets. The data transmission controller is also configured to, responsive to determining that a rate-based data transmission control is to be used to control a transmission of the second data packets, cause the packet engine to transmit the second data packets in groups, wherein transmission times of each group of second data packets are determined based on the rate of transmission.

33 Claims, 11 Drawing Sheets

(56) References Cited

U.S. PATENT DOCUMENTS 8,570,864 B2    10/2013  Li et al.
9,100,871 B2 *   8/2015  Nadas .................... H04L 47/12

OTHER PUBLICATIONS

Wang et al, Window-Based and Rate-Based Transmission Control Mechanisms over Space-Internet Links, IEEE, 14 pages, Jan. 2008.*

Mehrotra et al, Hybrid Window and Rate Based Congestion Control for Delay Sensitive Applications, IEEE, 5 pages, 2010.*

Ansari et al., TCP in wireless environments: problems and solutions, IEEE Communications Magazine, IEEE Service Center, Piscataway, US vol. 43, No. 3, Mar. 1, 2005, pp. 6.

Holmer et al., A Google congestion control algorithm for real-time communication draft-alvestrand-mcat-congestion-03, IETF Trust, Standard working draft, Internet Society (ISOC), Switzerland, Jun. 29, 2015, pp. 13.

PCT International Search Report and Written Opinion dated Jan. 23, 2017, issued in corresponding International Application No. PCT/US2016/057549 (13 pages).

* cited by examiner

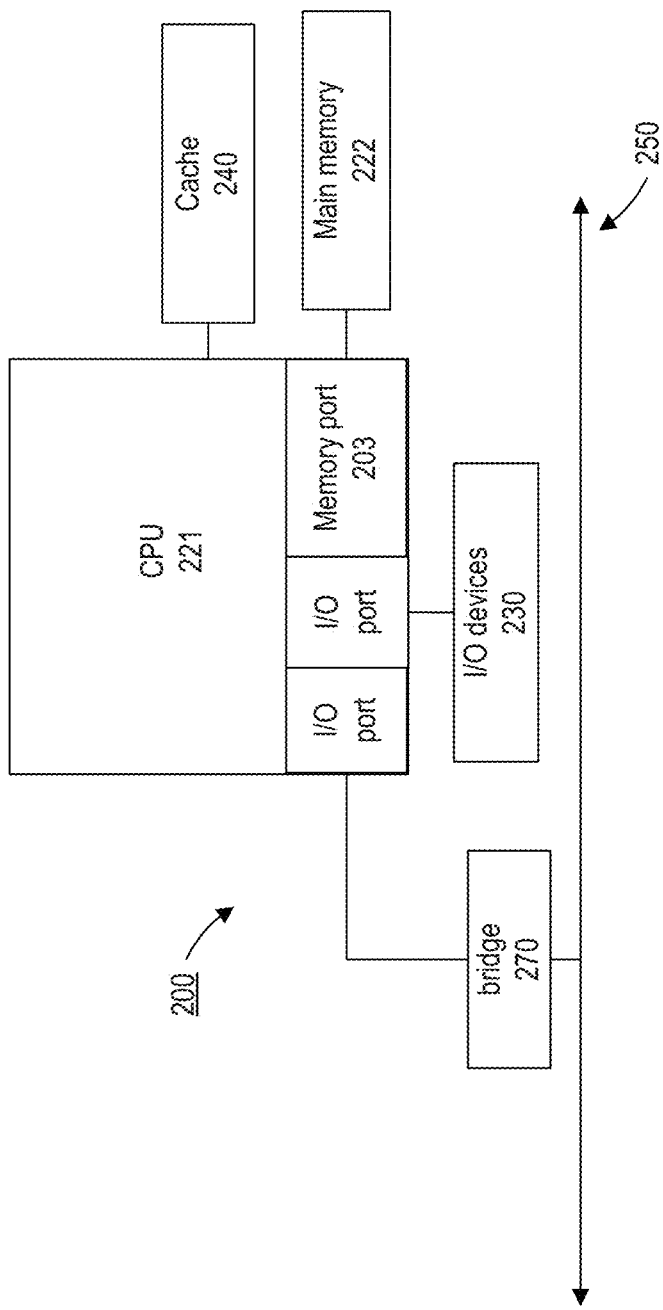

SYSTEM AND METHOD FOR RATE-BASED PACKET TRANSMISSION OVER A NETWORK

BACKGROUND

In a network environment, network congestion can occur when a link or a network node (e.g., a router) is overloaded with a large number of data packets, which can lead to significant transmission delay. Moreover, significant data packet loss can result, as the network node is unable to process the data packets and is forced to drop them. All these can lead to significant deterioration in network performance.

There are various schemes available to avoid overloading the network and to improve network performance. For example, transport communication protocol (TCP) provides a number of congestion control mechanisms, which include the use of a congestion window to control the amount of data sent into a network. A congestion window can define the maximum size of data that can be transmitted into the network within one network round trip time (RTT). RTT can be measured based on the time elapsed between when a sending device transmits a data packet and when the sending device receives, from the receiving device, an acknowledgment for the transmitted data packet. The congestion window can be increased to allow more data to be sent into the network, based on an indication that the network has capacity to transmit more data packets (e.g., a successful prior transmission of data packets through the network, which can be indicated by reception of acknowledgments that correspond to the transmitted data packets). The congestion window can also be decreased to allow less data to be sent into the network, based on an indication that that network is congested. Such an indication can be based on a detection of packet loss based on, for example, reception of certain number of duplicate acknowledgments, selective acknowledgments (SACK), when a timer that reflects an estimation of RTT expires before reception of acknowledgment, etc. The TCP congestion control mechanism also includes a retransmission algorithm, in which data packets are retransmitted when there is an indication that the data packets are lost. Moreover, TCP also allows delayed acknowledgment, in which several acknowledgments (in response to reception of several data packets) can be combined into a single acknowledgment, to reduce protocol overhead.

The aforementioned TCP congestion control mechanisms operate based on a number of assumptions. Such assumptions can include, for example: 1) the bandwidth of the bottleneck node (e.g., a router) remains the same; 2) changes in connection latency indicate packets being queued at the bottleneck node which indicates network congestion; 3) packet loss is typically an indication of, and is attributed to, network congestion; 4) packet reordering, which can also lead to duplicate acknowledgments, is a rare event and can be detected within a few packets; and 5) delayed acknowledgements are observed only when the delayed acknowledgement algorithm is active and are limited to one acknowledgement for a maximum of two packets.

Most, if not all, of the aforementioned assumptions can be inaccurate over some types of networks, such as a wireless network (e.g., WiFi, LTE, etc.). For example, in an LTE network, bandwidth can vary due to the channel/carrier aggregation techniques deployed at the lower layers. Also, there can be continuous latency variation, due to the retransmission mechanisms at media access control (MAC) and radio link control (RLC) layers. It has also been observed that at times of channel and carrier aggregation/de-aggregation, latency spikes to multitudes of the regular path latency. Moreover, high amounts of out-of-order packets, based on MAC and RLC configuration, may be observed. Furthermore, random data packet loss, which is not necessarily attributed to a network node's failure to process data packets due to congestion, occurs frequently in wireless network. Therefore, random data packet loss is typically not a reliable indicator of network congestion in such networks.

All these inaccurate assumptions can lead to incorrect determination of packet loss and/or incorrect determination of network congestion. For example, random data packet loss can be incorrectly interpreted to indicate network congestion. Also, under some wireless standards (e.g., 4G), a receiving device can send stretch acknowledgements, which can cover as much as a full RTT worth of data, but do not arrive within one RTT of the sending of the data. The delayed reception of stretch acknowledgments can affect the operation of TCP congestion control mechanisms in a number of ways. First, under TCP congestion control mechanisms, both the adjustment of the congestion window and the transmission of the next set of data packets are triggered by the reception of acknowledgments of previously-transmitted data packets, and can be postponed by the delayed reception of stretch acknowledgments that correspond to those previously-transmitted data packets, leading to under-utilization of network resources. Second, in a case where an incorrect determination of congestion-related packet loss results when, for example, a stretch acknowledgment arrives later than the expected RTT due to the accumulation of data for the generation of the stretch acknowledgment, rather than due to network congestion, unnecessary reduction of congestion window size and retransmission of data packets can result. Network performance can deteriorate as a result.

SUMMARY

In some aspects, an appliance for controlling data transmission is described. The appliance can include a packet engine configured to acquire data regarding a flow of first data packets over a link and to determine transport communication protocol (TCP) characteristics for the flow. The appliance can also include a data transmission controller configured to receive second data packets, determine a rate of transmission, and determine, based on one or more criteria, whether a rate-based data transmission control is to be used to control a transmission of the second data packets. The data transmission controller is also configured to, responsive to determining that a rate-based data transmission control is to be used to control a transmission of the second data packets, cause the packet engine to transmit the second data packets in groups, wherein transmission times of each group of second data packets are determined based on the rate of transmission.

In another aspect, a method for controlling data transmission is described. The method can include acquiring data regarding a flow of first data packets over a link, determining transport communication protocol (TCP) characteristics for the flow, receiving second data packets, determining a rate of transmission, determining, based on one or more criteria, whether a rate-based data transmission control is to be used to control a transmission of the second data packets; and responsive to determining that a rate-based data transmission control is to be used to control a transmission of the second data packets, transmitting the second data packets in groups, wherein transmission times of each group of second data packets are determined based on the rate of transmission.

In yet another aspect, a non-transitory computer readable storage medium is described. The storage medium stores a set of instructions that are executable by at least one processor of an appliance to cause the appliance to perform a method for controlling data transmission. The method can include acquiring data regarding a flow of first data packets over a link, determining transport communication protocol (TCP) characteristics for the flow, receiving second data packets, determining a rate of transmission, determining, based on one or more criteria, whether a rate-based data transmission control is to be used to control a transmission of the second data packets; and responsive to determining that a rate-based data transmission control is to be used to control a transmission of the second data packets, transmitting the second data packets in groups, wherein transmission times of each group of second data packets are determined based on the rate of transmission.

BRIEF DESCRIPTION OF THE DRAWINGS

Reference will now be made to the accompanying drawings showing example embodiments of this disclosure. In the drawings:

FIGS. 2A-2B are block diagrams of an exemplary computing device, consistent with embodiments of the present disclosure.

DETAILED DESCRIPTION

Reference will now be made in detail to the exemplary embodiments implemented according to the present disclosure, the examples of which are illustrated in the accompanying drawings. Wherever possible, the same reference numbers will be used throughout the drawings to refer to the same or like parts.

The embodiments described herein provide a rate-based data transmission control, which allows data to be transmitted over a network at a rate that reflects the actual network performance, and can mitigate the overloading and/or under-utilization of network due to incorrect determination of network congestion under legacy TCP congestion control mechanisms. The efficiency of network data flow can be improved as a result.

Figure 1:
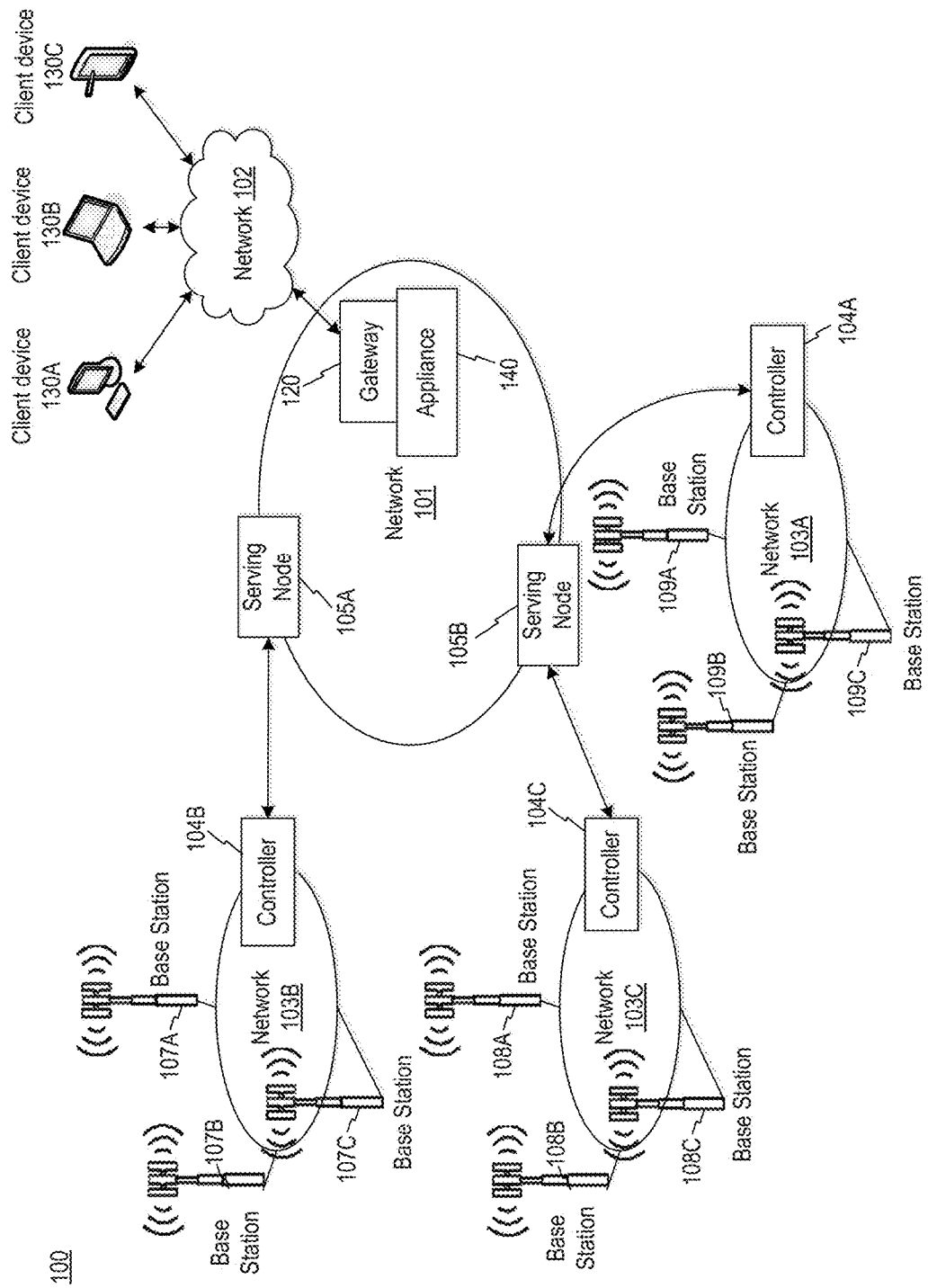
FIG. 1 is a block diagram of an exemplary network environment, consistent with embodiments of the present disclosure.

FIG. 1 is a block diagram of an exemplary communication system 100. Exemplary communication system 100 can be any type of system that transmits data packets over a network. For example, the exemplary communication system 100 can include one or more networks transmitting data packets across wired or wireless networks to terminals (terminals not shown in FIG. 1A). The exemplary communication system 100 can have network architectures of, for example, a GSM network, a UMTS network that adopts Wideband Code Division Multiple Access (W-CDMA) radio access technology, a CDMA2000 network, a WiMax network, an LTE network, etc.

The exemplary communication system 100 can include, among other things, one or more networks 101, 102, 103 (A-C), one or more controllers 104(A-D), one or more serving nodes 105(A-B), one or more base stations 107(A-C)-109(A-C), a gateway 120, and one or more appliances 140. At a high level, communication system 100 can have a tree-like network topology with gateway 120 being the tree's root node and base stations 107-109 being the leaves.

Network 101 can be any combination of radio networks, wide area networks (WANs), local area networks (LANs), or wireless networks suitable for packet-type communications, such as Internet communications. For example, in one exemplary embodiment, network 101 can be a General Packet Radio Service (GPRS) core network, which provides mobility management, session management and transport for Internet Protocol packet services in GSM and W-CDMA networks. In some embodiments, network 101 can include a gateway 120 and one or more serving nodes 105(A-B).

Network 102 can include any combinations of wide area networks (WANs), local area networks (LANs), or wireless networks suitable for packet-type communications. In some exemplary embodiments, network 102 can be, for example, Internet and X.25 networks. In some embodiments, network 102 can receive data packets from client devices 130(A-C). Client devices 130 can be any device that is configured to communicate with another remote device (e.g., a server, another client device, etc.) through networks 101 and 103. Network 102 can communicate data packet received from client devices 130 with network 101 via, for example gateway 120. While client devices 130 are portrayed as a computer (e.g., client device 130A), a laptop (e.g., client device 130B), and a tablet (e.g., client device 130C), it is appreciated that client devices 130 could be any type of device (e.g., such as a wearable smart watch) that communicates packets through networks 101, 102, and 103.

Gateway 120 is a device that converts formatted data provided in one type of network to a particular format required for another type of network. Gateway 120 may be a server, a router, a firewall server, a host, or a proxy server or any combination of the above. In some embodiments, gateway 120 can include load balancers or other similar systems. In some embodiments, gateway 120 can transform signals received from router 110 into a signal that network 101 can understand, and vice versa. Gateway 120 may be capable of processing webpage, image, audio, video, and T.120 transmissions alone or in any combination, and is capable of full duplex media translations. As an exemplary embodiment, gateway 120 can be a Gateway GPRS Support Node (GGSN) that supports interworking between the GPRS network and external packet switched networks, like the Internet and X.25 networks.

Serving nodes 105 are devices that deliver data packets from gateway 120 to a corresponding network 103 within its geographical service area and vice versa. A serving node 105 can be, for example, a server, a router, a firewall server, a host, or a proxy server. A serving node 105 can also have functions including packet routing and transfer, mobility management (attach/detach and location management), logical link management, network accessing mediation and authentication, and charging functions. In some embodiments, a serving node 105 can be a Serving GPRS Support Node (SGSN). In such embodiments, SGSN can have location register, which stores location information, e.g., current cell, current visitor location (VLR) and user profiles, e.g., International Mobile Subscriber Identity (IMSI), and addresses used in the packet data network, of all GPRS users registered with this SGSN.

Network 103 can include any radio transceiver networks within a GSM or UMTS network or any other wireless networks suitable for packet-type communications. In some exemplary embodiments, depending on the underlying transport technology being utilized, the Radio Access Network (RAN) or Backhaul area of network 103 can have a ring topology. In some embodiments, network 103 can be a RAN in a GSM system or a Backhaul area of a UMTS system. The exemplary network 103 can include, among other things, base stations 107-109 (e.g., base transceiver stations (BTSs) or Node-Bs), and one or more controllers 104(A-C) (e.g., base-station controllers (BSCs) or radio network controllers (RNCs)). Mobile terminals (not shown in FIG. 1) communicate with BTS/Node-B 107-109 which have radio transceiver equipment. BTS/Node-B 107-109 communicate with BSC/RNC 104(A-C), which are responsible for allocation of radio channels and handoffs as users move from one cell to another. The BSC/RNC 104(A-C) in turn communicate to serving nodes 105, which manage mobility of users as well as provide other functions such as mediating access to the network and charging.

Appliance 140 is a device that can optimize and control, for example, wide area network (WAN) traffic. In some embodiments, appliance 140 optimizes other types of network traffic, such as local area network (LAN) traffic, metropolitan area network (MAN) traffic, or wireless network traffic. Appliance 140 can also handle different networks like Multiprotocol Label Switching ("MPLS") common in many corporate networks. Appliance 140 can optimize network traffic by, for example, scheduling data packets in an established communication link so that a certain number of data packets can be transmitted or dropped at a scheduled time and rate, to avoid or to mitigate network congestion in networks 101 and 102, and in the downstream networks (e.g., networks 103). In some embodiments, appliance 140 is a physical device, such as Citrix System's Branch Repeater, Netscaler, or CloudBridge. In some embodiments, appliance 140 can be a virtual appliance. In some embodiments, appliance 140 can be a physical device having multiple instances of virtual machines (e.g., virtual Cloud Bridge). As shown in FIG. 1, appliance 140 can be deployed at various locations within network 101. In some embodiments, appliance 140 can be located at gateway 120, at controller 104, at one or more base stations 107-109, or any other locations, to optimize the network traffic at that location.

In some embodiments, communication system 100 further includes a data center communicatively coupled with appliance 140 (not shown in FIG. 1). The data center can be central repository, either physical or virtual, for the storage, management, and dissemination of data and information pertaining to a particular public or private entity. The data center can be used to house computer systems and associated components, such as one or more physical servers, virtual servers, and storage systems. The data center can include, among other things, one or more servers configured to provide certain services. The data center can also include an appliance that can optimize network traffic in a manner similar to appliance 140 of FIG. 1. In some embodiment, the appliance at the data center can work in conjunction with appliance 140 in optimizing network traffic.

Appliance 140 and gateway 120 can be deployed as or executed on any type and form of specific computing device (e.g., such as the computing device of FIGS. 2A-2B) capable of communicating on any type and form of network described herein.

Figure 2A:
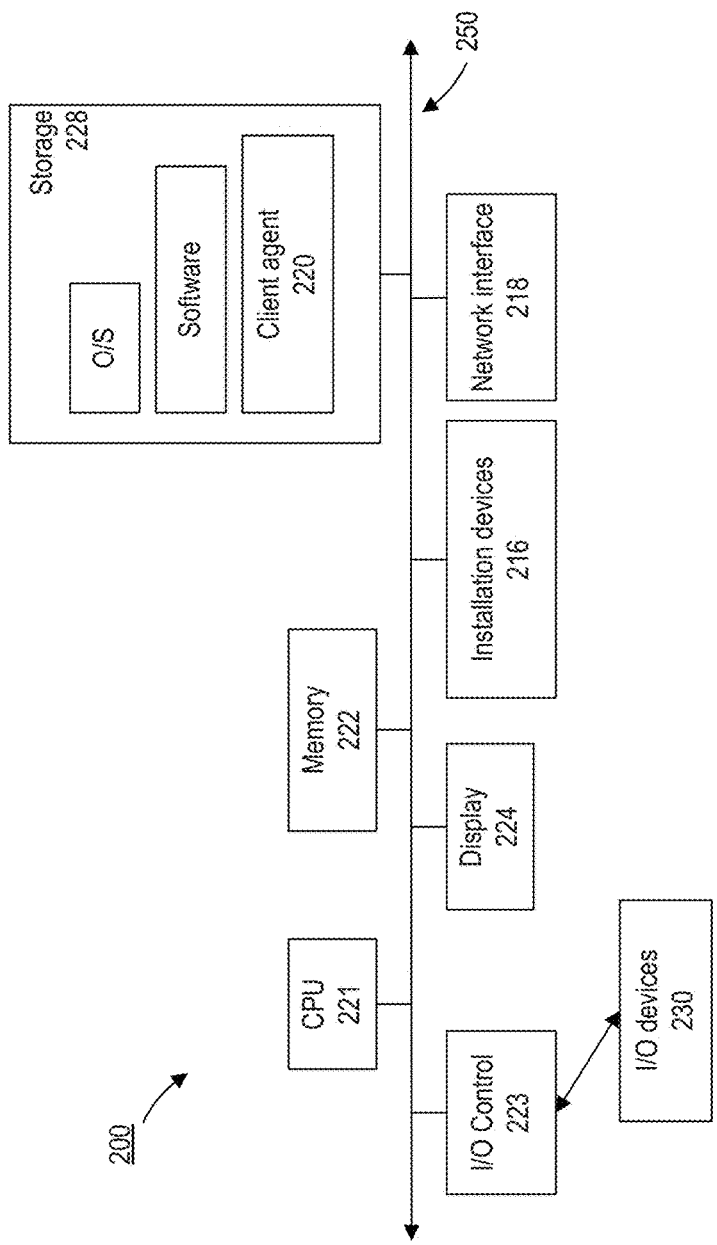

As shown in FIGS. 2A-2B, each computing device 200 includes a central processing unit (CPU) 221 and a main memory 222. CPU 221 can be any logic circuitry that responds to and processes instructions fetched from the main memory 222. CPU 221 can be a single or multiple microprocessors, field-programmable gate arrays (FPGAs), or digital signal processors (DSPs) capable of executing particular sets of instructions stored in a memory (e.g., main memory 222) or cache (e.g., cache 240). The memory includes a tangible and/or non-transitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), flash drive, flash memory, registers, caches, or a semiconductor memory. Main memory 222 can be one or more memory chips capable of storing data and allowing any storage location to be directly accessed by CPU 221. Main memory 222 can be any type of random access memory (RAM), or any other available memory chip capable of operating as described herein. In the exemplary embodiment shown in FIG. 2A, CPU 221 communicates with main memory 222 via a system bus 250. Computing device 200 can also include a visual display device 224 and an input/output (I/O) device 230 (e.g., a keyboard, mouse, or pointing device) connected through I/O controller 223, both of which communicate via system bus 250. It is appreciated that CPU 221 can also communicate with memory 222 and other devices in manners other than through system bus 250, such as through serial communication manners or point-to-point communication manners. Furthermore, I/O device 230 can also provide storage and/or an installation medium for the computing device 200.

FIG. 2B depicts an embodiment of an exemplary computing device 200 in which CPU 221 communicates directly with main memory 222 via a memory port 203. CPU 221 can communicate with a cache 240 via a secondary bus (not shown), sometimes referred to as a backside bus. In some other embodiments, CPU 221 can communicate with cache 240 via system bus 250. Cache 240 typically has a faster response time than main memory 222. In some embodiments, such as the embodiment shown in FIG. 2B, CPU 221 can communicate directly with I/O device 230 via an I/O port (not shown). In further embodiments, I/O device 230 can be a bridge 270 between system bus 250 and an external communication bus, such as a USB bus, an Apple Desktop Bus, an RS-232 serial connection, a SCSI bus, a FireWire™ bus, a FireWire 800™ bus, an Ethernet bus, an AppleTalk™ bus, a Gigabit Ethernet bus, an Asynchronous Transfer Mode bus, a HIPPI bus, a Super HIPPI bus, a SerialPlus bus, a SCI/LAMP bus, a FibreChannel™ bus, or a Serial Attached small computer system interface bus, or some other type of data bus.

As shown in FIG. 2A, computing device 200 can support any suitable installation device 216, such as a disk drive or other input port for receiving one or more computer-readable media such as, for example, a USB device, flash drive, SD memory card; a hard-drive; or any other device suitable for installing software and programs such as any client agent 220, or portions thereof. Computing device 200 can further comprise a storage device 228, such as one or more hard disk drives or redundant arrays of independent disks, for storing an operating system and other related software, and for storing application software programs such as any program related to client agent 220. Optionally, any of the installation devices 216 could also be used as storage device 228.

Furthermore, computing device 200 can include a network interface 218 to interface to a LAN, WAN, MAN, or the Internet through a variety of link including, but not limited to, standard telephone lines, LAN or WAN links (e.g., 802.11, T1, T3, 56 kb, X.25), broadband link (e.g., ISDN, Frame Relay, ATM), wireless connections (Wi-Fi, Bluetooth, Z-Wave, Zigbee), or some combination of any or all of the above. Network interface 218 can comprise a built-in network adapter, network interface card, PCMCIA network card, card bus network adapter, wireless network adapter, USB network adapter, modem or any other device suitable for interfacing computing device 200 to any type of network capable of communication and performing the operations described herein.

Figure 3A:
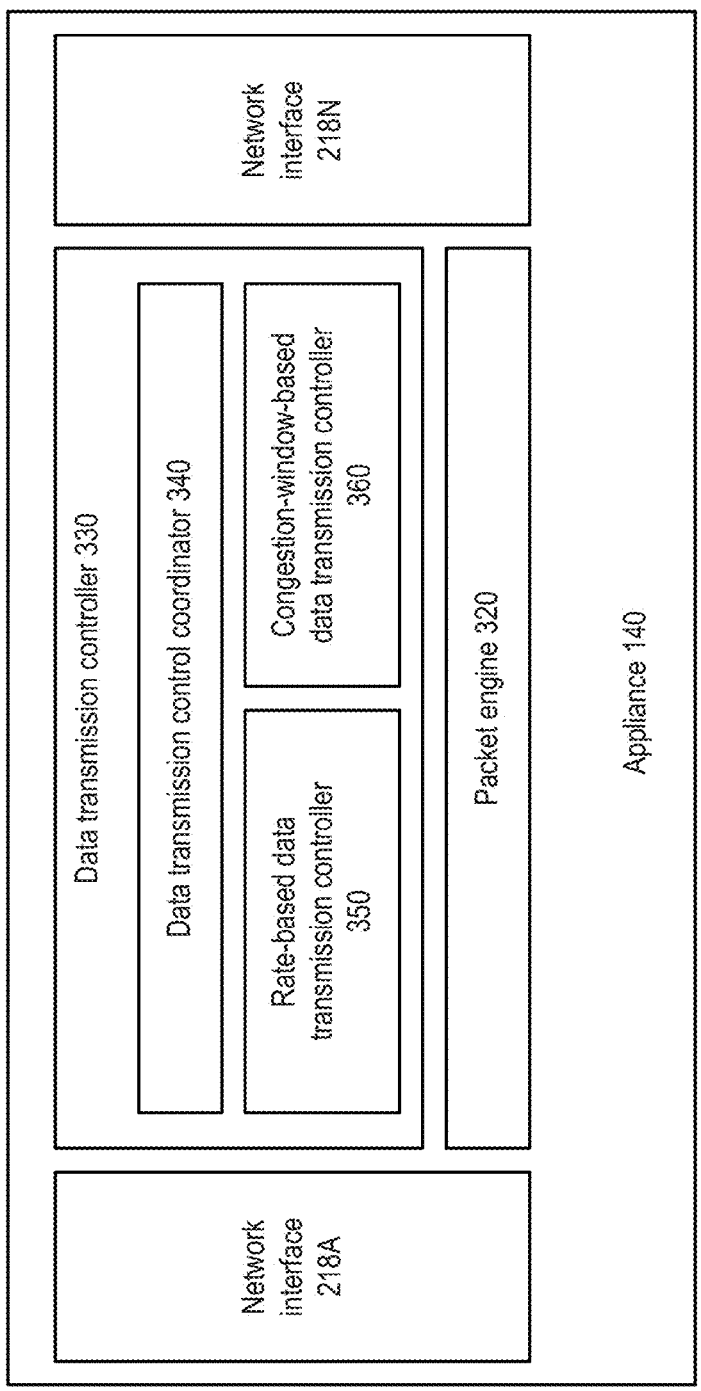
FIG. 3A is a block diagram of an exemplary appliance illustrated in FIG. 1, consistent with embodiments of the present disclosure.

FIG. 3A is a block diagram of an exemplary appliance 140 illustrated in FIG. 1, consistent with embodiments of the present disclosure. Appliance 140 can include one or more network interfaces 218A-N consistent with network interface 218 of FIG. 2A, a packet engine 320, and a data transmission controller 330. Although FIG. 3A depicts network interfaces 218A-218N as two network interfaces, it is appreciated that interfaces 218A-218N may include any number of network interfaces.

In some embodiments, packet engines 320, which is also referred to as a "packet processing engine," a "packet processor," or a "data processor," is responsible for controlling and managing the processing of data packets received and transmitted by appliance 140 via network interfaces 218A-N. Packet engine 320 can be one or more modules, which can be one or more packaged functional hardware units designed for use with other components or a part of a program that performs a particular function (e.g., controlling and managing the processing of data packets), corresponding to the particular step, of related functions. Packet engine 320 can be embodied as a single packet engine or any number of a plurality of packet engines that can operate at the data link layer (layer 2), network layer (layer 3), or the transport layer (layer 4) of a network stack (e.g., such as the layers and protocols of the Open System Interconnection communications model). Packet engine can be configured to accomplish some or all of the steps described herein after being executed by CPU 221. In some embodiments, the data packets are carried over the data link layer via the Ethernet communication protocol, which comprises any of the family of WAN or LAN protocols, such as those protocols covered by the IEEE 802.3. In some embodiments, the network stack can have any type and form of wireless protocols, such as IEEE 802.11 and/or mobile internet protocols. One or more packet engines 320 intercept or receive data packets at the network layer, such as via the IP communication protocol. In some embodiments, packet engine 320 intercepts or receives data packets at the transport layer, such as via the TCP communication protocols, and can operate at any session or any application layer above the transport layer.

Packet engine 320 can include a buffer for queuing one or more data packets during processing of the data packets. Additionally, packet engine 320 can communicate via one or more communication protocols to transmit and receive a plurality of network data packets across one or more links via network interfaces 218A-N. The links connect appliance 140 to other devices, such as, for example, another appliance located remotely from appliance 140. Packet engine 320 can be configured to acquire data regarding the flow and store the acquired data in an operatively connected computer memory. The sent and received data packets operating across one or more links can be considered "data flow" or "flow."

In some embodiments, packet engine 320 can collect data indicative of the operation of an active flow. For example, the data can include information indicative of packet send times, packet receive times, round trip times for both sending and receiving the same packet (or an acknowledgement thereof), information indicative of a loss event of data packets, a total number of packets sent and received, and/or other information indicative of the congestion and/or operational aspects of one or more active flows operating across a link. Based on the data, packet engine 320 can dynamically determine one or more TCP characteristics of the flow. Flow characteristics may include, for example, packet round trip times, queuing delay for the packets, congestion window size information, etc.

In some embodiments, data transmission controller 330 is responsible for controlling the transmission of data, which can be received from other entities (e.g., a software application, another physical device, etc.) into the network. Data transmission controller 330 further includes a data transmission control coordinator 340, a rate-based data transmission controller 350, and a congestion-window-based data transmission controller 360. As to be described below, rate-based data transmission controller 350 can work in conjunction with congestion-window-based data transmission controller 360 in controlling the transmission of data into the network, under the coordination of data transmission control coordinator 340.

In some embodiments, rate-based data transmission controller 350 can determine one or more transmission times when the data are to be transmitted to the network via network interfaces 218A-N, based on information that reflects network performance. Rate-based data transmission controller 350 can also determine a size of the data to be transmitted at the aforementioned transmission times by determining, for example, the payload size of the data packets and the number of data packets to be transmitted into the network, based on the network performance information. In some embodiments, the network performance information can be derived from the one or more TCP characteristics of a prior data flow calculated by packet engine 320. For example, as to be described below, rate-based data transmission controller 350 can estimate a rate of transmission of data packets within the network based on the transmission times of data packets and receiving times of the acknowledgments, provided by packet engine 320. Rate-based data transmission controller 350 can then control packet engine 320 to transmit multiple groups of data packets at multiple corresponding transmission times, where the transmission times are separated by a time interval that reflects the rate of transmission. In some embodiments, the size of each group of data packets can be identical. As to be described below, the aforementioned data packets size and time interval can be determined based on the rate of transmission within the network, as well as RTT.

Figure 4:
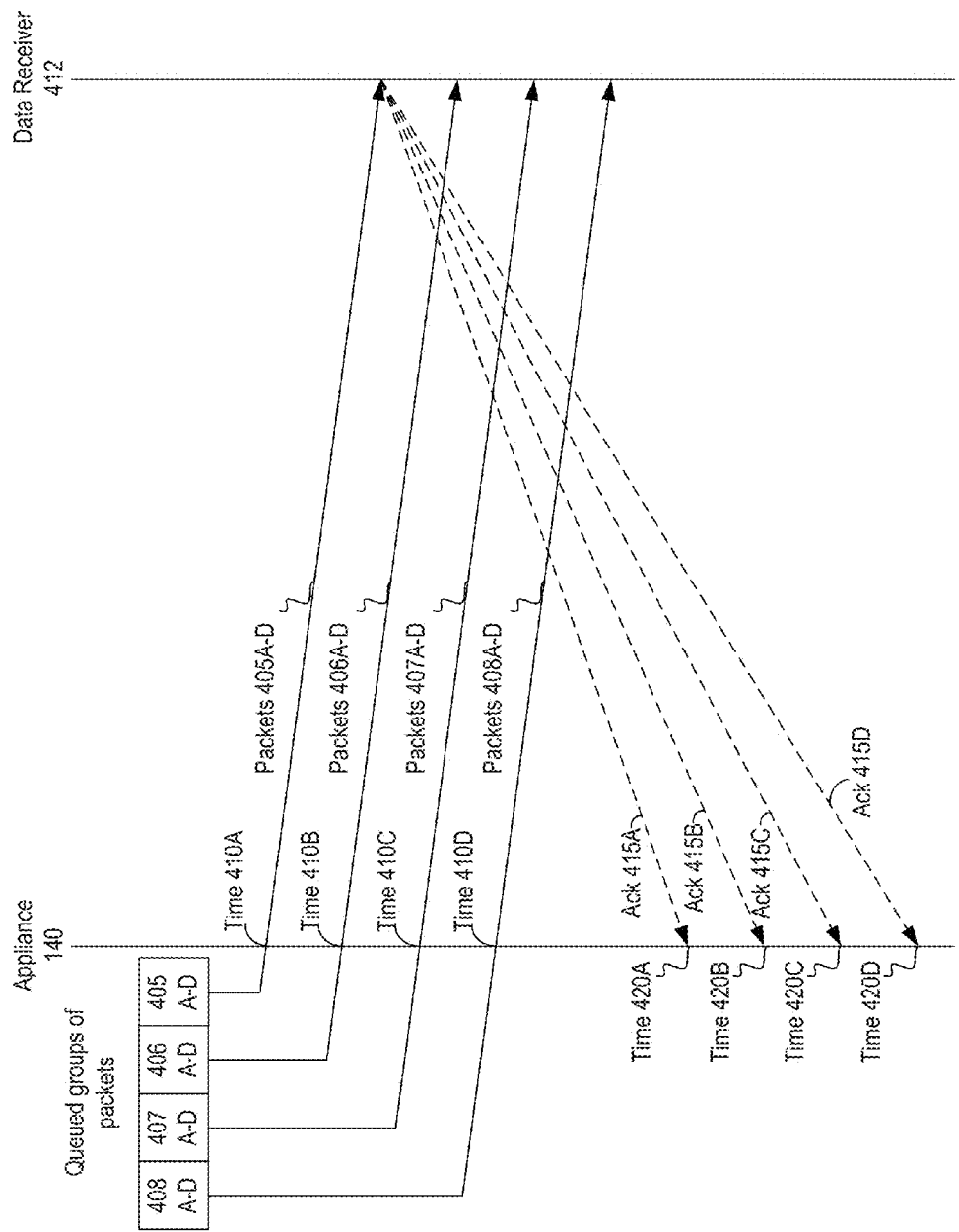
FIG. 4 is illustrates an exemplary set of communications used for estimating a rate of transmission of data packets, consistent with embodiments of the present disclosure.

In some embodiments, as discussed above, the rate of transmission can be determined based on the transmission times of data packets and the receiving times of the associated acknowledgments. Reference is now made to FIG. 4, which illustrates an example method of determining the rate of transmission. As an illustrative example, packets 405A-D, 406A-D, 407A-D, and 408A-D are queued at a buffer of, for example, packet engine 320. Each of packets 405A-D has a data size of, respectively, $D_A$, $D_B$, $D_C$, and $D_D$. Each of packets 405A-D is transmitted to data receiver 412 at substantially the same time, at time 410A. As data receiver 412 receives the packets, it transmits an acknowledgment for each of the received packets, with ack 415A corresponding to packet 405A, ack 415B corresponding to packet 405B, ack 415C corresponding to packet 405C, and ack 415D corresponding to packet 405D. As shown in FIG. 4, appliance 140 receives ack 415A at time 420A, ack 415B at time 420B, ack 415C at time 420C, and ack 415D at time 420D.

In this illustrative example, a rate of transmission can be determined based on the following formula:

$$\text{Rate}=(D_B+D_C+D_D)/(\text{time }420D-\text{time }420A)$$

It is appreciated that other means can be used to make this determination, such as a state table, etc.

In a case where a delayed acknowledgment, which corresponds to multiple data packets, is received, the rate calculation can be adjusted to include all the data packets acknowledged by that delayed acknowledgment. As an illustrative example, if acks 415B and 415C are not received, and ack 415D is a delayed acknowledgment that corresponds to packets 405B, 405C, and 405D, the rate of transmission calculation can be adjusted to account for the sizes of packets 405B, 405C, and 405D acknowledged by ack 415D. In this particular example, the same formula as above can still be used to calculate the rate of transmission.

In some embodiments, the rate of transmission can also be calculated based on other parameters, such as minimum path RTT, and congestion window value included in the TCP characteristics of the flow. Such a calculation can be used to calculate the initial rate of transmission when the receiving times of acknowledgments are not yet available for rate of transmission determination.

After packets 405A-D are transmitted, without waiting for the reception of the corresponding acknowledgements, the rest of the packet groups can also be transmitted according to the order of the queuing at transmission times determined based on the rate of transmission. For example, as shown in FIG. 4, packets 406A-D are transmitted at time 410B, packets 407A-D are transmitted at time 410C, and packets 408A-D are transmitted at time 410D. Each of times 410A, 410B, 410C, and 410D can be separated by a certain time interval. In some cases, each group of data packets 405A-D, 406A-D, 407A-D, and 408A-D can be of the same size, but is not required. A combination of the duration of the certain time interval and the data sizes of data packets 405A-D, 406A-D, 407A-D, and 408A-D can reflect the rate of transmission. As an illustrative example, in a case where each group of data packets 405A-D, 406A-D, 407A-D, and 408A-D is of the same size, and that the duration of the time intervals between times 410A, 410B, 410C, and 410D is identical, the rate of transmission can be reflected by a ratio between the size of data packets 405A-D and the duration of the time interval between the transmission times of data packets 405A-D (time 410A) and of data packets 406A-D (time 410B).

In some embodiments, the rate of transmission can be updated approximately once per RTT, or between a duration that is longer than one RTT. For example, referring to FIG. 4, the acknowledgments received within the duration of one RTT after the transmission of packets 405A-D can be collected, and the rate of transmission can be calculated based on the receiving times of those acknowledgments. In some cases, the RTT can be estimated based on a difference between the transmission time of a previously-sent packet and the receiving time of the corresponding acknowledgment. For example, RTT can be estimated based on a difference between times 420A and 410A (for packet 405A and ack 415A), or a difference between transmission time and receiving time for other packet-acknowledgment pairs (e.g., between times 420B and 410A for packet 405B and ack 415B, between times 420C and 410A for packet 405C and ack 415C, between times 420D and 410A for packet 405D and ack 415D, etc.). The RTT can also be post-processed, such as averaging (e.g., averaging the RTTs for any number of packets 405A-D), and filtering (e.g., discarding RTTs that are not associated with the packets 405A-D, discarding an RTT that is significantly different from other RTTs of the first data packets, etc.).

If no valid measurement is available within the duration of one RTT (e.g., no acknowledgment is received, hence no receiving times of acknowledgment can be sampled), the updating of the rate of transmission can be skipped. In such a case, the transmission time of the next group of data packets can be determined based on, for example, a rate of transmission determined at a prior RTT. As an illustrative example, if no acknowledgment is received within one RTT of the transmission time of packets 406A-D (time 410B), the next transmission time (time 410C) can be determined based on the same rate of transmission that determines the time interval that separates between transmission times 410A and 410B.

In some embodiments, as discussed above, the rate of transmission can be updated based on only acknowledgments that belong to the same group of data packets. The determination of whether acknowledgments belong to the same group of data packets can be based on, for example, the sequence numbers included in the acknowledgments, as well as the transmission times of the corresponding packets. If an acknowledgment that does not belong to the same group of data packets is received within that RTT, the rate of transmission will not be updated for that acknowledgement. As an illustrative example, if, within one RTT after time 410A, a stretch acknowledgment for a previous groups of data packets is received in addition to acks 415A-D, the rate of transmission will not be updated based on the receiving times of that stretch acknowledgement.

In some embodiments, the rate of transmission can be updated based on an averaging function, where a rate of transmission calculated for a current RTT is averaged with the rates of transmission calculated in prior RTTs. The averaging can also be performed based on the receiving times of acknowledgments across RTTs. The averaged rate of transmission will then be provided to packet engine 320 to control the transmission of the data to the network. In some embodiments, the averaging function can be an exponential moving average function, with more recent samples of rate of transmission being associated with a larger weight than, for example, samples of rate of transmission determined at a relatively distant past. In a case where a rate of transmission is not calculated for the current RTT (e.g., no valid measurement of acknowledgment receiving time is available within one RTT of time 410A, etc.), the averaged rate of transmission may not be updated, and the transmission of the next group of data packets can be controlled based on the current averaged rate of transmission.

In some embodiments, the updating of rate of transmission can be adjusted based on an indication that one or more transmitted packets are lost and fail to reach data receiver 412. The indication can come from, for example, appliance 140 receiving a selective acknowledgment (SACK) indicating the sequence numbers of the packets received by data receiver 412. If the sequence numbers listed in the SACK do not include a sequence number of a transmitted packet, rate-based data transmission controller 350 can determine that the transmitted packet is lost. Another possible indication of packet loss can be that appliance 140 fails to receive an acknowledgment for a transmitted packet within a certain amount of time after the transmission. In both cases, rate-based data transmission controller 350 can determine that the rate of calculation may not be calculated based on the receiving times of the acknowledgments received in the current RTT. Instead, the rate of transmission determined in a prior RTT can be provided to packet engine 320 to control the transmission of next group of data packets. In some embodiments, the provided rate of transmission can be further reduced by a predetermined factor, to mitigate the risk of overloading the network.

After the rate of transmission is determined, rate-based data transmission controller 350 can also determine a total size of data to be transmitted in the group of data packets. The total size of data to be transmitted can be limited by, for example the queue size of a downstream network node (e.g., a router). In some embodiments, as discussed above, packet engine 320 can determine, as part of TCP flow characteristics, the queuing delay of data packets. Rate-based data transmission controller 350 can estimate the queue size based on the queuing delay, and control the total size of data to be transmitted to be at a certain ratio of the queue size, to mitigate the risk of overloading the network node and congesting the network.

Based on the total size of data to be transmitted in the group of data packets, as well as the rate of transmission, rate-based data transmission controller 350 can then determine the time interval that separates the transmission times of each group of data packets, as well as the size of each group of data packets. In some cases, the time intervals that separate the transmission times can be identical, but is not required. In some embodiments, each group of data packets can include a number of data packets that rate-based data transmission controller 350 received from other entities (e.g., a software application, another physical device, etc.). In some embodiments, rate-based data transmission controller 350 can also extract the payload of the received data packets, and generate the group of data packets using the extracted payload. In some cases, the size of each group of data packets can be identical, but is not required.

Referring back to FIG. 3A, data transmission controller 330 also includes congestion-window-based data transmission controller 360. In some embodiments, congestion-window-based data transmission controller 360 can determine a size of data (as reflected by, e.g., a number of data packets, a size of packet payload, etc.) to be transmitted into the network, within a duration of one RTT, based on the congestion window size calculated by packet engine 320. The congestion window size can be controlled based on legacy TCP congestion avoidance algorithms. Congestion-window-based data transmission controller 360 can then control packet engine 320 to transmit data of the determined size into the network, within the duration of one RTT.

In some embodiments, data transmission control coordinator 340 can coordinate the operations of rate-based data transmission controller 350 and congestion-window-based data transmission controller 360. For example, data transmission control coordinator 340 can determine, based on satisfaction of one or more criteria, to allow rate-based data transmission controller 350 to control the transmission of data by packet engine 320, and to dynamically give the control to congestion-window-based data transmission controller 360 when the one or more criteria are no longer satisfied.

The criteria for determining whether to allow rate-based data transmission controller 350 or congestion-window-based data transmission controller 360 to control packet engine 320 can include, for example, a number of packets being transmitted in the network being at least equal to a threshold. For example, when a connection has just been established and the sending devices have only transmitted a small number of data packets and received a small number of corresponding acknowledgments, the transmission rate of the small number of data packets do not necessarily reflect the current performance of the network. In such a case, data transmission control coordinator 340 can determine that the receiving times of the small number of acknowledgments do not provide an accurate estimation of the rate of transmission of data in the network. As a result, data transmission control coordinator 340 can determine to allow congestion-window-based data transmission controller 360 to control the transmission of data packets at packet engine 320, until it receives an indication that there are more data packets being transmitted in the network. In some embodiments, such an indication can include, for example, that the congestion window size (which can increase when acknowledgments are received) is at least equal to a pre-determined threshold, or any other parameters that reflect that a number of data packets that is at least equal to the threshold has been successfully transmitted.

The aforementioned criteria can also include, for example, the size of data to be transmitted into the network by rate-based data transmission controller 350 within one RTT being at least equal to the aforementioned threshold. Data transmission control coordinator 340 can make the determination based on, for example, the determined rate of transmission. The size of data to be transmitted within one RTT thus determined can be larger or smaller than the total size of a group of data packets to be transmitted by rate-based data transmission controller 350 (which can be determined based on, for example, the queue size of a downstream network node as discussed above). If the size of data to be transmitted within one RTT under the control of rate-based data transmission controller 350 is less than the aforementioned threshold, data transmission control coordinator 340 can determine that the network is too slow (congested) to complete the transmission of the groups of data packets within the RTT using rate-based transmission. As a result, data transmission control coordinator 340 can determine to allow congestion-window-based data transmission controller 360 to control the transmission of data packets at packet engine 320. In that case, congestion-window-based data transmission controller 360 can set the congestion window size to be equal to the amount of data to be transmitted at the determined rate of transmission within one RTT. In some cases, congestion-window-based data transmission controller 360 can transmit, within one RTT, a number of data packets based on the aforementioned size of the congestion window. After receiving an acknowledgment of at least one of the transmitted data packets, congestion-window-based data transmission controller 360 can then increase the size of the congestion window, and then transmit the next set of data packets based on the increased size of the congestion window.

In some embodiments, data transmission control coordinator 340 can also be pre-configured to select rate-based data transmission controller 350. The pre-configured selection can be overridden when any of the aforementioned criteria is not satisfied. In some embodiments, data transmission control coordinator 340 can also be pre-configured to select congestion-window-based data transmission controller 360, and then switch to rate-based data transmission controller 350 when at least some of the aforementioned criteria are satisfied.

Figure 3B:
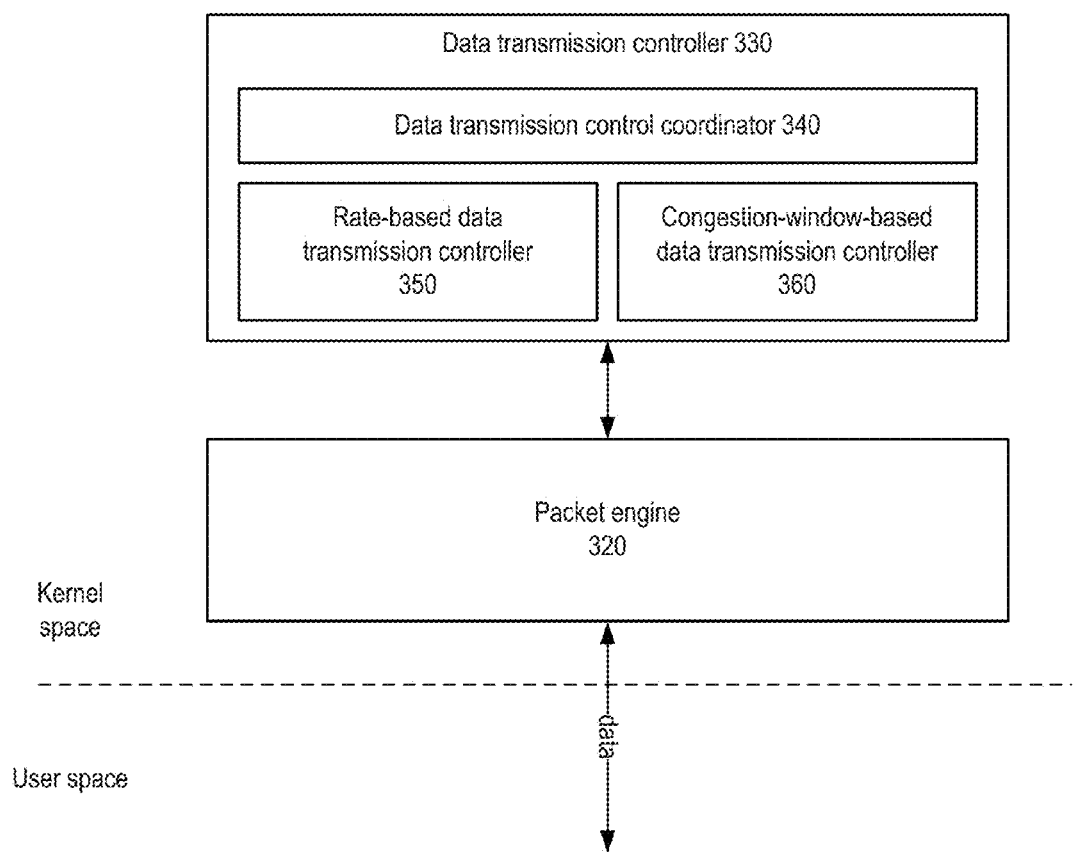
FIG. 3B is a block diagram of a portion of an exemplary appliance illustrated in FIG. 3A, consistent with embodiments of the present disclosure.

FIG. 3B is a block diagram of a portion of exemplary appliance 140 illustrated in FIG. 3A, consistent with embodiments of the present disclosure. In some embodiments, the operating system of appliance 140 allocates, manages, or otherwise segregates the available system memory into what is referred to as kernel space (system space) and user space (application space). The kernel space is typically reserved for running the kernel, including any device drivers, kernel extensions, or other kernel related software. The kernel can be the core of the operating system, and provides access, control, and management of resources and hardware-related elements of the appliance 140. In accordance with some embodiments of the appliance 140, the kernel space can also include a number of network services or processes working in conjunction with packet engine 320, data transmission controller 330, or any portion thereof. Additionally, the embodiments of the kernel can depend on the operating system installed, configured, or otherwise used by appliance 140.

User space is the memory area or portion of the operating system used by user mode applications or programs otherwise running in user mode. A user mode application cannot access kernel space directly and uses service calls to access kernel services. The operating system uses the user space for executing or running applications and provisioning of user level programs, services, processes, and/or tasks. As an example, the operating system can execute software of network interfaces 218A-N in the user space.

Figure 5:
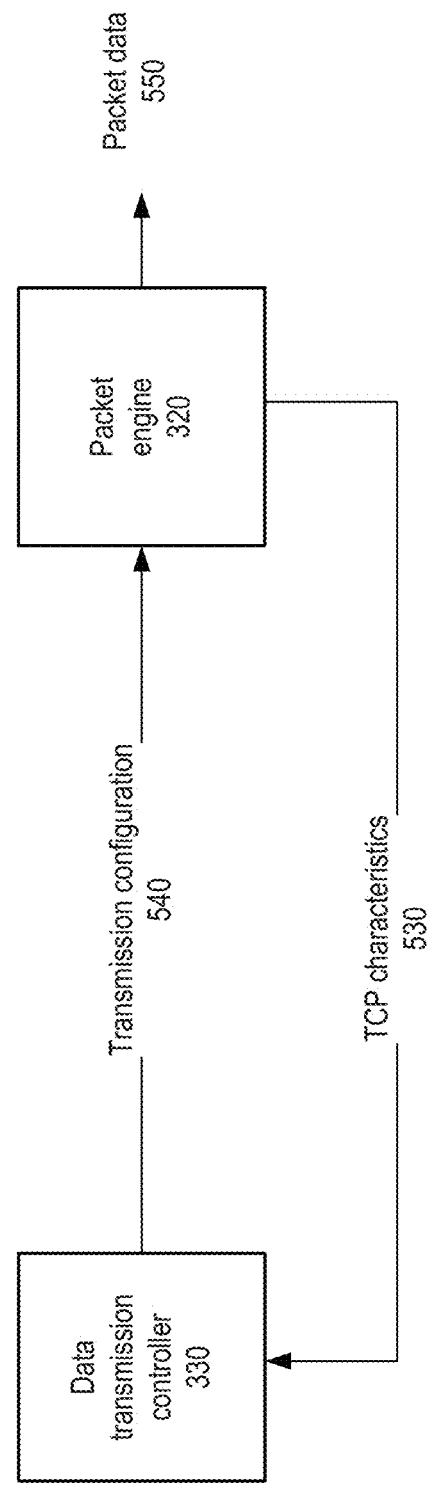
FIG. 5 is a block diagram of an exemplary embodiment for a data transmission controller, consistent with embodiments of the present disclosure.

FIG. 5 is a block diagram of an exemplary embodiment for data transmission control, consistent with embodiments of the present disclosure. As discussed above, data transmission controller 330 can be configured to receive one or more TCP characteristics, such as TCP characteristics 530 that include information in connection with an active flow of packet data 550, from packet engine 320. TCP characteristics 530 can include information including, for example, one or more queuing delays, information indicative of flow congestion, information indicative of one or more congestion window sizes, and information indicative of one or more average round trip times for packets in an active flow 450. A flow is "active" when packets are being sent and received across a TCP link.

According to some embodiments, one or more processors (e.g., CPU 221) execute data transmission controller 330. Data transmission controller 330 can receive TCP characteristics 530, then determine whether a rate-based data transmission control or a congestion-window-based data transmission control is used to control the transmission of data packets by packet engine 320, based on TCP characteristics 530 (e.g., current congestion window size). In a case where a rate-based data transmission control is to be used, data transmission controller 330 can also determine a rate of transmission, and the total size of groups of data packets to be transmitted at that rate of transmission, based on TCP characteristics 530 (e.g., queuing delay, receiving times of acknowledgments, etc.) Data related to data transmission control (e.g., whether rate-based or congest-window-based control is to be used, transmission times, size of data to be transmitted, etc.) can be included in transmission configuration 540, which can then be provided to packet engine 320.

Figure 6:
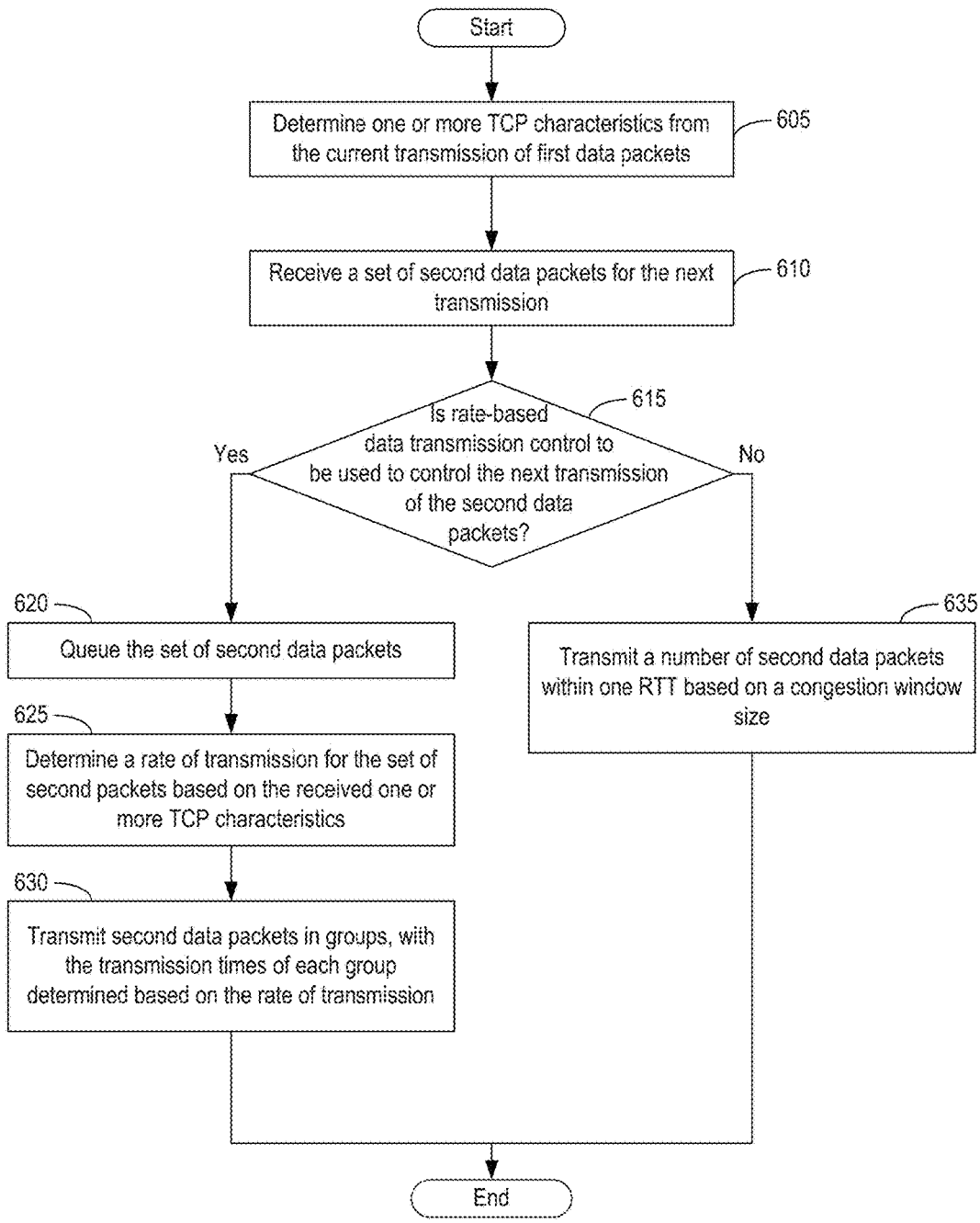
FIG. 6 is a flowchart representing an exemplary method of data transmission control, consistent with embodiments of the present disclosure.

FIG. 6 is a flowchart representing an exemplary method 600 of data transmission control, consistent with embodiments of the present disclosure. It will be readily appreciated that the illustrated procedure can be altered to delete steps or further include additional steps. While method 600 is described as being performed by an appliance (e.g., appliance 140), it is appreciated that method 600 can be performed by other devices alone or in combination with the appliance.

After an initial start, appliance 140, using for example one or more packet engines (e.g., packet engine 320), can determine one or more TCP characteristics from a current transmission of first data packets, in step 605. The TCP characteristics can include, for example, congestion window size, RTT, receiving times of acknowledgments that correspond to first data packets, etc.

In step 610, appliance 140 can receive a set of second data packets for the next transmission. Appliance 140 can receive the second data packets from, for example, a software application, or other physical devices (e.g., client devices 130A-C) that are communicatively coupled with appliance 140. In some embodiments, step 610 can occur before, after, or concurrently with step 605.

In step 615, appliance 140 determines whether rate-based data transmission control is to be used to control the transmission of packets at packet engine 320. As discussed above, the determination can be based on whether one or more pre-determined criteria are satisfied. In some cases, the criteria can include, for example, whether there are a sufficient number of data packets being transmitted, such that the receiving times of the acknowledgments can provide an estimation of the rate of transmission of data in the network. Such a determination can be based on, for example, the congestion window size information included in the TCP characteristics, which can reflect the number of data packets being transmitted and acknowledged. The criteria can be satisfied when the congestion window size is at least equal to a pre-determined threshold. Also, in some cases, the criteria can also include a size of data to be transmitted into the network by rate-based data transmission controller 350 within one RTT exceeding the pre-determined threshold, which can indicate that the network has sufficient capacity to handle the data to be transmitted by rate-based data transmission controller 350. In some embodiments, step 615 can be performed by data transmission control coordinator 340 of FIG. 3A.

If appliance 140 determines that rate-based data transmission control is to be used (in step 615), in step 620 appliance 140 can queue the set of second data packets at, for example, packet engine 320. Appliance 140 can then determine a rate of transmission for the set of second data packets based on the received one or more TCP characteristics, in step 625. As discussed above, the rate of transmission of can be determined based on, for example, the size of data packets transmitted and the receiving times of the corresponding acknowledgments, as illustrated in FIG. 4. In a case where the receiving times of the acknowledgments are not yet available (e.g., to calculate the initial rate of transmission), the rate of transmission can also be determined based on the RTT and congestion window size information included in the received TCP characteristics. Moreover, the rate of transmission can also be determined based on previously-determined rates of transmission using, for example, a moving average function. In some cases, the rate of transmission for the second data packets can also be determined based on previously-determined rates of transmission when, for example, no acknowledgment is received within one RTT of transmission of a group of packets, or when packet loss is detected.

After the rate of transmission is determined in step 625, rate-based data transmission controller 350 can then control the transmission of second data packets at packet engine 320, in step 630. As discussed above, rate-based data transmission controller 350 can control packet engine 320 to transmit the queued second data packets (or packets derived from the second data packets) in groups, with the transmission times of each group separated by a certain time interval, The time interval can be determined based on the rate of transmission determined in step 625. The size of each group of packets can also be determined based on, for example, the rate of transmission, the total size of data to be transmitted, etc. Rate-based data transmission controller 350 can then transmit the time interval and data size information to packet engine 320 as part of transmission configuration (e.g., transmission configuration 540). Packet engine 320 can then transmit the data based on the transmission configuration.

On the other hand, if data transmission control coordinator 340 determines that congestion-window-based data transmission control is to be used in step 615, congestion-window-based data transmission controller 360 can then provide a number of second data packets to packet engine 320 for transmission within one RTT, in step 635. The number of second data packets provided can be determined based on a congestion window size. In some cases, the congestion window size can be determined based on the congestion window size information included in the TCP characteristics. In some cases, the congestion window size can be determined based on an estimation of a size of data to be transmitted within one RTT at previously-determined rate of transmission.

Figure 7A:
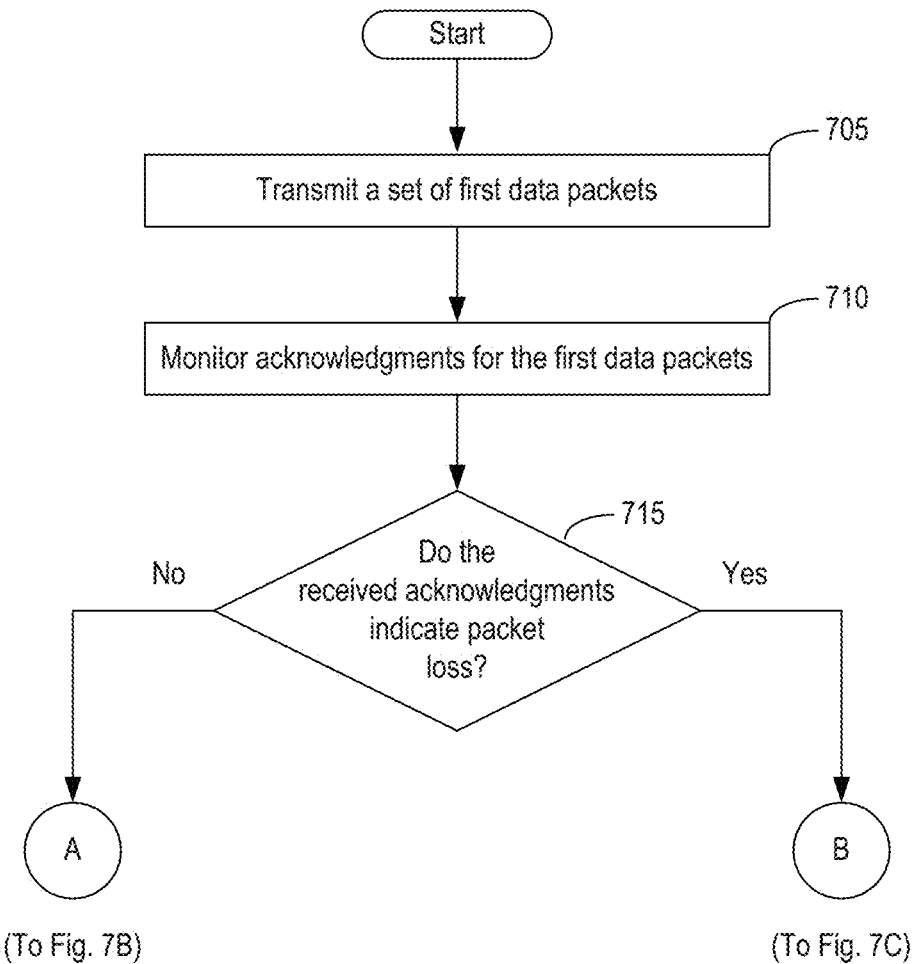
FIGS. 7A-7C are flowcharts representing exemplary methods of data transmission control, consistent with embodiments of the present disclosure.
Figure 7B:
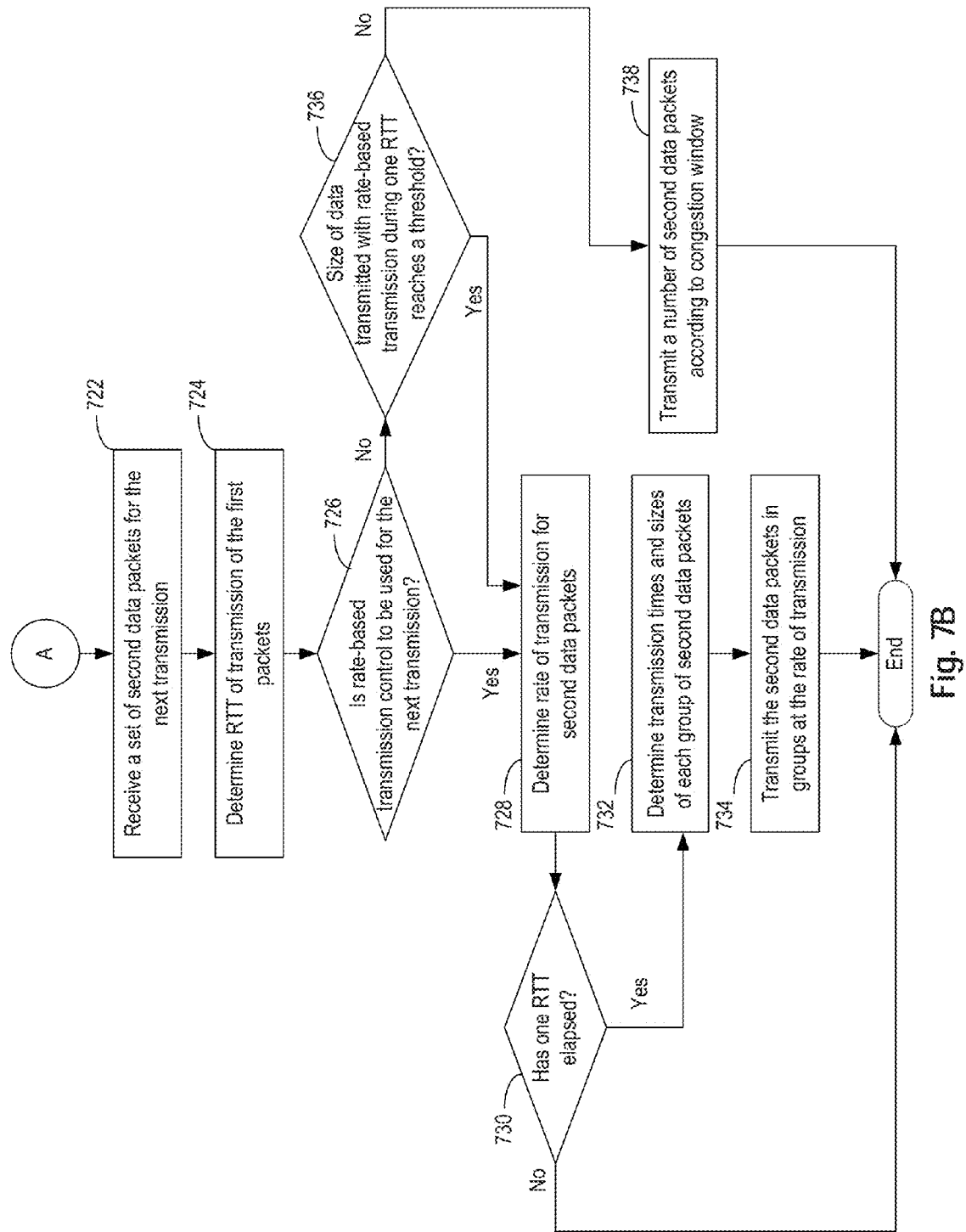
Figure 7C:
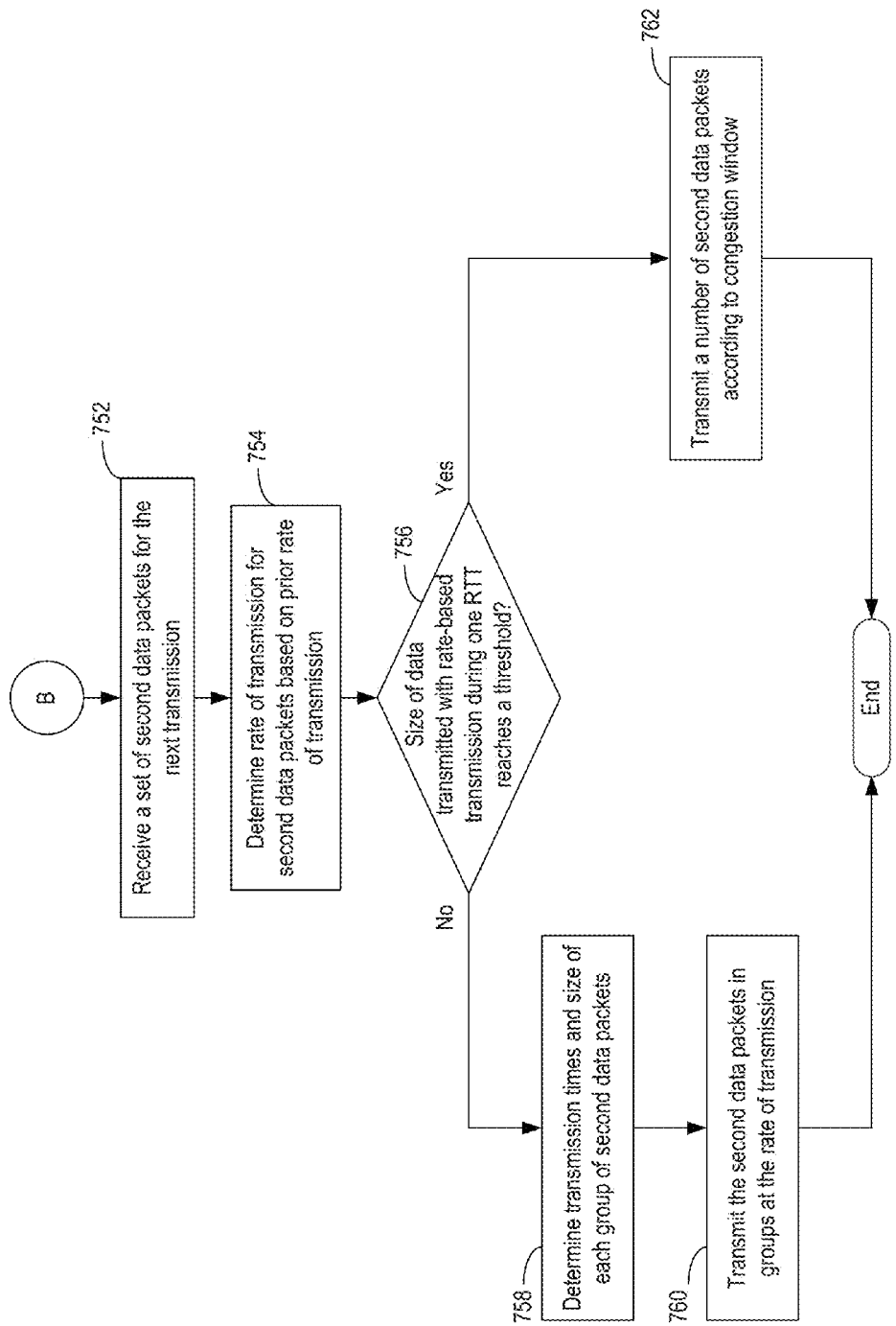

FIGS. 7A-7C are flowcharts representing an exemplary method 700 of data transmission control, consistent with embodiments of the present disclosure. It will be readily appreciated that the illustrated procedure can be altered to delete steps or further include additional steps. While method 700 is described as being performed by an appliance (e.g., appliance 140), it is appreciated that method 700 can be performed by other devices alone or in combination with the appliance.

After an initial start, appliance 140, using for example one or more packet engines (e.g., packet engine 320), can transmit a set of first data packets, in step 705. After the transmission of the first data packets, appliance 140 can monitor and receive the acknowledgements that correspond to the set of first data packets, in step 710.

After receiving the acknowledgements in step 710, appliance 140 can then determine whether the received acknowledgments indicate that one or more of the first data packets are lost and fail to reach the recipient (e.g., data receiver 412), in step 715. As discussed above, the indication of packet loss can come from, for example, appliance 140 receiving a SACK that indicates the sequence numbers of the packets received by data receiver 412. Based on the information from SACK, appliance 140 can then determine that one or more of the first data packets are not received by data receiver 412 and are lost. The indication of packet loss can also come from appliance 140 not receiving an acknowledgment for a transmitted packet within a certain amount of time (e.g., an expected RTT) after the transmission.

If appliance 140 determines that none of the transmitted first data packets has been lost (step 715), appliance 140 can then proceed to step 722 of FIG. 7B, where appliance 140 can receive a set of second data packets for the next transmission. Appliance 140 can then determine an RTT of transmission of the first data packets, in step 724. The determination can be based on, for example, the transmission times of the first data packets, and the receiving times of the corresponding acknowledgments. The RTT can also be post-processed, such as averaging (e.g., averaging the RTTs for a number of first data packets) and filtering (e.g., discarding RTTs that are not associated with the first data packets, discarding an RTT that is significantly different from other RTTs of the first data packets, etc.). In some embodiments, receiving step 722 can occur after determination step 724.

After the RTT of transmission of the first data packets is determined (step 724), appliance 140 can then determine whether rate-based transmission control is to be used for the next transmission of the second data packets, in step 726. As discussed before, the determination can be based on different factors. For example, when a connection is just established, rate-based transmission control is not used until the congestion window size reaches a pre-determined threshold, which can indicate that there are a sufficient number of packets being transmitted in the network such that the measured rate of transmission can reflect the actual network performance. The determination can also be based on, for example, whether appliance 140 is pre-configured to use rate-based transmission. In some embodiments, step 726 can be performed by data transmission control coordinator 340.

If data transmission control coordinator 340 determines that rate-based transmission control is to be used for the transmission of second data packets (step 726), rate-based data transmission controller 350 can then determine the rate of transmission, in step 728. The determination can be based on, for example, the size of first data packets and the receiving times of the corresponding acknowledgments, as illustrated in FIG. 4. In a case where the receiving times of the acknowledgments are not yet available (e.g., to calculate the initial rate of transmission), the rate of transmission can also be determined based on RTT and congestion window size. Moreover, the rate of transmission can also be determined based on previously-determined rates of transmission using, for example, a moving average function. In some cases, the rate of transmission for the second data packets can also be determined based on previously-determined rates of transmission when, for example, no acknowledgments are received within one RTT of transmission of the first data packets.

After the rate of transmission for the second data packets is determined (step 728), rate-based data transmission controller 350 can then determine whether one RTT (determined in step 724) has elapsed from, for example, the transmission of the first data packets, in step 730. As discussed before, the rate of transmission can be updated once every RTT, or between a longer duration than one RTT. In some embodiments, if rate-based data transmission controller 350 determines that one RTT has not elapsed in step 730, it can then proceed to end without using the rate of transmission determined in step 728, until one RTT has elapsed.

On the other hand, if rate-based data transmission controller 350 determines that at least one RTT has elapsed in step 730, it can then determine the transmission times and sizes of each group of second data packets to be transmitted, in step 732. As discussed before, the second data packets can be sent in groups, with the transmission times of each group separated by a certain time interval. Rate-based data transmission controller 350 can determine the transmission times based on, for example, the rate of transmission determined in step 728. For example, as discussed before, a ratio between a size of a group of data packets being transmitted and the duration of the time interval can reflect the rate of transmission. Rate-based data transmission controller 350 can also determine the size of a group of data packets to be transmitted based on, for example, an estimation of queue size at a downstream network node (e.g., a router) based on the RTT information determined in step 724, which can reflect a queuing delay at that network node. In some cases, the data size of each group of packets can be identical. In some cases, the transmission times can be separated by an identical time interval. After the transmission times and size of packet information are determined in step 732, rate-based data transmission controller 350 can then provide the information to packet engine 320 in the form of configuration data (e.g., transmission configuration 540). Packet engine 320 can then transmit the second data packets in groups, in step 734.

On the other hand, if data transmission control coordinator 340 determines that rate-based transmission control is not to be used for the next transmission of the second data packets in step 726 (e.g., due to a pre-configuration to use congestion-window-based transmission control), it can then determine whether a size of data transmitted using rate-based transmission during one RTT (determined in step 724) is at least equal to a threshold, in step 736. As discussed above, the determination can provide an indication about whether the network has capacity to handle the data transmitted at the determined rate of transmission. If data transmission control coordinator 340 determines that the size of data transmitted using rate-based transmission during one RTT is at least equal to the threshold in step 736, it can proceed to step 728 to allow rate-based data transmission controller 350 to control the transmission of the second data packets.

If data transmission control coordinator 340 determines that the size of data transmitted using rate-based transmission during one RTT does not exceed the threshold (step 736), it can then proceed to allow congestion-window-based data transmission controller 360 to control the transmission of the second data packets. Packet engine 320 can determine the congestion window size based on, for example, the received acknowledgments according to legacy TCP congestion avoidance algorithms, or based on an estimated size of data to be transmitted within one RTT at a previously-determined rate of transmission. Congestion-window-based data transmission controller 360 can then provide a number of second data packets to packet engine 320 for transmission based on the congestion window size. Packet engine 320 can then transmit the number of second data packets, in step 738. In some embodiments (not shown in FIG. 7B), during the one RTT when the number of second data packets are transmitted in step 738, if the congestion window is increased (due to, for example, reception of acknowledgments that correspond to data packets transmitted prior to or during step 738) such that the increased congestion window size exceeds the pre-determined threshold, data transmission control coordinator 340 can determine to switch back to rate-based transmission and proceed back to step 728.

Referring back to FIG. 7A, if appliance 140 determines that at least one of the transmitted first data packets has been lost in step 715, appliance 140 can proceed to step 752 of FIG. 7C, where appliance 140 can receive a set of second data packets for the next transmission. Appliance 140 can then determine the rate of transmission for second data packets based on a rate of transmission determined in a prior RTT, in step 754. In some cases, the determined rate of transmission can be further reduced by a factor to mitigate the risk of overloading the network.

After the rate of transmission is determined, appliance 140 (e.g., data transmission control coordinator 340) can then determine whether a size of data transmitted with rate-based transmission during one RTT (calculated in step 724) is at least equal to a threshold, in step 756. The determination in step 756 is similar to as described in step 736 of FIG. 7B, the details of which are not repeated here.

If data transmission control coordinator 340 determines that a size of data transmitted with rate-based transmission during one RTT is at least equal to the threshold (step 756), it can then proceed to allow rate-based data transmission controller 350 to control the transmission of the second data packets based on the rate of transmission determined in step 754. In step 758, rate-based data transmission controller 350 can determine the transmission times and size of groups of second data packets for the rate-based transmission. Packet engine 320 can then transmit the groups of second data packets, in step 760. Steps 758 and 760 are similar to steps 732 and 734 of FIG. 7B, the details of which are not repeated here.

On the other hand, if data transmission control coordinator 340 determines that a size of data transmitted with rate-based transmission during one RTT does not exceed the threshold in step 756, it can then proceed to allow congestion-window-based data transmission controller 360 to control the transmission of second data packets. Packet engine 320 can determine the congestion window size based on, for example, received acknowledgments according to legacy TCP congestion avoidance algorithms, or based on an estimated size of data to be transmitted within one RTT at the rate of transmission determined at step 754. Congestion-window-based data transmission controller 360 can then provide a number of second data packets to packet engine 320 for transmission within one RTT, based on the congestion window size, in step 762. In some embodiments (not shown in FIG. 7C), during the one RTT when the number of second data packets are transmitted using congestion window in step 762, if the congestion window is increased (due to, for example, reception of acknowledgments that correspond to data packets transmitted prior to or during step 762) such that the increased congestion window size exceeds the pre-determined threshold, data transmission control coordinator 340 can determine to switch back to rate-based transmission and proceed back to step 758.

With embodiments of the present disclosure, data can be transmitted at a rate of transmission that reflects the actual network performance. As a result, the transmission of data can be less affected by bandwidth and latency variation, out-of-order packets, stretch acknowledgments, etc., which are prevalent in wireless networks and can lead to incorrect determinations that a packet loss is due to network congestion, and the corresponding changes in the congestion window size, under legacy TCP congestion control mechanisms. The transmission rate of data can then be maintained in light of random packet loss, and both overloading and underutilization of the network can be avoided. Such an arrangement can also avoid major bursts in a connection, which can also deteriorate the network performance. The efficiency of network data flow can be improved as a result.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. An appliance for controlling data transmission, comprising:
    a packet engine configured to acquire data regarding a flow of first data packets over a link and to determine transport communication protocol (TCP) characteristics for the flow; and
    a data transmission controller configured to:
        switch between a rate-based data transmission control and a congestion window-based data transmission control;
        receive second data packets;
        determine a rate of transmission based on the TCP characteristics;
        determine, based on one or more criteria, whether the rate-based data transmission control or the congestion window-based data transmission control is to be used to control a transmission of the second data packets; and
        responsive to the determination that the rate-based data transmission control is to be used to control a transmission of the second data packets, cause the packet engine to switch to the rate-based data transmission control to transmit the second data packets in groups, wherein transmission times of each group of second data packets are determined based on the rate of transmission.

2. The appliance of claim 1, wherein the TCP characteristics include information about a queuing delay at a network node associated with the link; wherein a size of the groups of the second data packets is determined based on the queuing delay.

3. The appliance of claim 1, wherein the TCP characteristics include information about a round trip time (RTT) of the link and a congestion window size; wherein the rate of transmission is determined based on the RTT and the congestion window size.

4. The appliance of claim 1, wherein the TCP characteristics include receiving times of acknowledgments corresponding to at least some of the first data packets; wherein the rate of transmission is determined based on data sizes of the least some of the first data packets and at least some of the receiving times.

5. The appliance of claim 1, wherein the rate of transmission is determined using one or more rates of transmission previously determined.

6. The appliance of claim 5, wherein the data transmission controller is configured to:
    based on a detection of a packet loss, determine that the rate of transmission is to be determined based on the one or more rates of transmission previously determined.

7. The appliance of claim 5, wherein the data transmission controller is configured to:
    determine that the rate of transmission is not to be determined based on a receiving time of a stretch acknowledgment.

8. The appliance of claim 5, wherein the data transmission controller is configured to:
    based on a determination that no acknowledgment that corresponds to any of the first data packets has been received within a time period related to a round trip time (RTT) of the link after the transmission of one or more of the first data packets, determine that the rate of transmission is to be determined based on the one or more rates of transmission previously determined.

9. The appliance of claim 3, wherein the one or more criteria include the congestion window size being at least equal to a threshold; and wherein the data transmission controller is configured to:
    responsive to a determination that the congestion window size is smaller than the threshold, determine that a rate-based data transmission control is not to be used to control a transmission of the second data packets.

10. The appliance of claim 3, wherein the one or more criteria include a first size of data capable of being transmitted within the RTT at the determined rate of transmission being at least equal to a threshold; and wherein the data transmission controller is configured to:
    determine the first size;
    determine whether the first size is smaller than the threshold; and
    responsive to a determination that the first size is smaller than the threshold, determine that a rate-based data transmission control is not to be used control a transmission of the second data packets.

11. The appliance of claim 3, wherein the data transmission controller is configured to:
    responsive to a determination that a rate-based data transmission control is not to be used to control a transmission of the second data packets, cause the packet engine to transmit a number of the second data packets, wherein the number is determined based on the congestion window size.

12. A method for controlling data transmission, comprising:
    acquiring data regarding a flow of first data packets over a link;
    determining transport communication protocol (TCP) characteristics for the flow;
    receiving second data packets;
    determining a rate of transmission based on the TCP characteristics;
    determining, based on one or more criteria, whether a rate-based data transmission control or a congestion window-based data transmission control is to be used to control a transmission of the second data packets; and
    responsive to determining that the rate-based data transmission control is to be used to control a transmission of the second data packets, switching from the congestion window-based data transmission control to the rate-based data transmission control and transmitting the second data packets in groups, wherein transmission times of each group of second data packets are determined based on the rate of transmission.

13. The method of claim 12, wherein the TCP characteristics include information about a queuing delay at a network node associated with the link; wherein a size of the groups of the second data packets is determined based on the queuing delay.

14. The method of claim 12, wherein the TCP characteristics include information about a round trip time (RTT) of the link and a congestion window size; wherein the rate of transmission is determined based on the RTT and the congestion window size.

15. The method of claim 12, wherein the TCP characteristics include receiving times of acknowledgments corresponding to at least some of the first data packets; wherein the rate of transmission is determined based on data sizes of the least some of the first data packets and at least some of the receiving times.

16. The method of claim 12, wherein the rate of transmission is determined using one or more rates of transmission previously determined.

17. The method of claim 16, further comprising:
based on a detection of a packet loss, determining that the rate of transmission is to be determined based on the one or more rates of transmission previously determined.

18. The method of claim 16, further comprising:
determining that the rate of transmission is not to be determined based on a receiving time of a stretch acknowledgment.

19. The method of claim 16, further comprising:
based on a determination that no acknowledgment that corresponds to any of the first data packets has been received within a time period related to a round trip time (RTT) of the link after the transmission of one or more of the first data packets, determining that the rate of transmission is to be determined based on the one or more rates of transmission previously determined.

20. The method of claim 14, wherein the one or more criteria include the congestion window size being at least equal to a threshold; further comprising:
responsive to determining that the congestion window size is smaller than the threshold, determining that a rate-based data transmission control is not to be used to control a transmission of the second data packets.

21. The method of claim 14, wherein the one or more criteria include a first size of data capable of being transmitted within the RTT at the determined rate of transmission being at least equal to a threshold; further comprising:
determining the first size;
determining whether the first size is smaller than the threshold; and
responsive to determining that the first size is smaller than the threshold, determining that a rate-based data transmission control is not to be used control a transmission of the second data packets.

22. The method of claim 14, further comprising:
responsive to determining that a rate-based data transmission control is not to be used to control a transmission of the second data packets, transmitting a number of the second data packets, wherein the number is determined based on the congestion window size.

23. A non-transitory computer readable storage medium that stores a set of instructions that are executable by at least one processor of an appliance to cause the appliance to perform a method for controlling data transmission, the method comprising:
acquiring data regarding a flow of first data packets over a link;
determining transport communication protocol (TCP) characteristics for the flow;
receiving second data packets;
determining a rate of transmission based on the TCP characteristics;
determining, based on one or more criteria, whether a rate-based data transmission control or a congestion window-based data transmission control is to be used to control a transmission of the second data packets; and
responsive to determining that a rate-based data transmission control is to be used to control a transmission of the second data packets, transmitting the second data packets in groups, wherein transmission times of each group of second data packets are determined based on the rate of transmission.

24. The non-transitory computer readable storage medium of claim 23, wherein the TCP characteristics include information about a queuing delay at a network node associated with the link; wherein a size of groups of the second data packets is determined based on the queuing delay.

25. The non-transitory computer readable storage medium of claim 23, wherein the TCP characteristics include information about a round trip time (RTT) of the link and a congestion window size; wherein the rate of transmission is determined based on the RTT and the congestion window size.

26. The non-transitory computer readable storage medium of claim 23, wherein the TCP characteristics include receiving times of acknowledgments corresponding to at least some of the first data packets; wherein the rate of transmission is determined based on data sizes of the least some of the first data packets and at least some of the receiving times.

27. The non-transitory computer readable storage medium of claim 23, wherein the rate of transmission is determined using one or more rates of transmission previously determined.

28. The non-transitory computer readable storage medium of claim 27, wherein the set of instructions that are executable by the at least one processor of the appliance to cause the appliance to further perform:
based on a detection of a packet loss, determining that the rate of transmission is to be determined based on the one or more rates of transmission previously determined.

29. The non-transitory computer readable storage medium of claim 27, wherein the set of instructions that are executable by the at least one processor of the appliance to cause the appliance to further perform:
determining that the rate of transmission is not to be determined based on a receiving time of a stretch acknowledgement.

30. The non-transitory computer readable storage medium of claim 27, wherein the set of instructions that are executable by the at least one processor of the appliance to cause the appliance to further perform:
based on a determination that no acknowledgment that corresponds to any of the first data packets has been received within a time period related to a round trip time (RTT) of the link after the transmission of one or more of the first data packets, determining that the rate of transmission is to be determined based on the one or more rates of transmission previously determined.

31. The non-transitory computer readable storage medium of claim 25, wherein the one or more criteria include the congestion window size being at least equal to a threshold; wherein the set of instructions that are executable by the at least one processor of the appliance to cause the appliance to further perform:
responsive to determining that the congestion window size is smaller than the threshold, determining that a rate-based data transmission control is not to be used to control a transmission of the second data packets.

32. The non-transitory computer readable storage medium of claim 25, wherein the one or more criteria include a first size of data capable of being transmitted within the RTT at the determined rate of transmission being at least equal to a threshold; wherein the set of instructions that are executable by the at least one processor of the appliance to cause the appliance to further perform:

determining the first size;

determining whether the first size is smaller than the threshold; and responsive to determining that the first size is smaller than the threshold, determining that a rate-based data transmission control is not to be used control a transmission of the second data packets.

33. The non-transitory computer readable storage medium of claim 25, wherein the set of instructions that are executable by the at least one processor of the appliance to cause the appliance to further perform:

responsive to determining that a rate-based data transmission control is not to be used to control a transmission of the second data packets, transmitting a number of the second data packets, wherein the number is determined based on the congestion window size.

\* \* \* \* \*